United States Patent [19]

Milligan et al.

[11] 4,017,466

[45] Apr. 12, 1977

[54] POLYBENZIMIDA ZOQUINAZOLINES AND PREPOLYMERS FOR MAKING SAME

[75] Inventors: Robert J. Milligan, San Diego, Calif.; Walter P. Fitzgerald, Jr., deceased, late of San Diego, Calif.; by Mary E. Fitzgerald, surviving spouse

[73] Assignee: Whittaker Corporation, Los Angeles, Calif.

[22] Filed: Feb. 7, 1975

[21] Appl. No.: 547,890

[52] U.S. Cl. .................. 260/78 TF; 260/46.5 E; 260/47 CP; 260/49; 260/63 R; 260/78.41; 428/411; 428/474

[51] Int. Cl.$^2$ ............... C08G 73/00; C08G 73/18

[58] Field of Search ............ 260/47 CP, 49, 63 R, 260/78 TF, 46.5 E, 78.4 E, 78 R; 428/411, 474

[56] References Cited

UNITED STATES PATENTS

| | | | |
|---|---|---|---|
| 3,503,929 | 3/1970 | Loudas | 260/47 |
| 3,546,166 | 12/1970 | Rabilloud et al. | 260/47 |
| 3,575,941 | 4/1971 | Steinberg | 260/78.4 |

*Primary Examiner*—Lester L. Lee
*Attorney, Agent, or Firm*—Jay H. Quartz; Donald E. Nist

[57] ABSTRACT

Highly cross-linked, infusible, poly(benzimidazoquinazolines) are made by heat polymerizing fusible condensation prepolymers and pre-copolymers which, in turn, are made by the melt condensation of bis-2(o-aminoaryl)imidazoles with (a) aryl esters of extended aromatic carboxylic acids having a carboxyl functionality greater then two or (b) a mixture of the latter acid esters and aryl esters of aromatic dicarboxylic acids, respectively. The prepolymers and pre-copolymers may be employed to form laminates, molded articles, etc., having high strength and high temperature characteristics.

30 Claims, 3 Drawing Figures

POLYBENZIMIDA ZOQUINAZOLINES AND PREPOLYMERS FOR MAKING SAME

BACKGROUND OF THE INVENTION

This invention relates to highly cross-linked poly(benzimidazoquinazolines) and to the prepolymers and process for making them.

Poly(benzimidazoquinazolines) have previously been made by several methods using various reactants. One method consists of synthesizing the poly(benzimidazoquinazoline) in polyphosphoric acid from bisbenzoxazinones and tetramines or from 2,2'-(o-aminoaryl)bisbenzimadazoles and aromatic acid chlorides [N. Yoda and M. Kurihara, Macromol. Rev. 5D, 178 (1971)]. A major disadvantage of this method is that the resulting linear poly(benzimidazoquinazolines) are infusible and unprocessable. That is, they cannot be used, for example, to impregnate fibers to produce laminates or as molding compounds to produce molded articles. A second method of producing poly(benzimidazoquinazolines) comprises the solution condensation of 2,2'-(o-aminoaryl)bisbenzimidazoles with aromatic di- or tri-acid chlorides followed by ring closure under vacuum at elevated temperatures as described in U.S. Pat. No. 3,503,929, issued Mar. 31, 1970. A difficulty with this method is that, although the intermediate polyamidobenzimidazole polymer is processable, it must be purified by isolation from the condensation solvent and redissolved prior to use. A third method is described in the latter patent and comprises the melt condensation of a tetramine and a diphenyl ester of N,N'-di(o-carboxy phenyl) dicarboxylic acid amide followed by solid-state polymerization. A limitation of both of the methods described in U.S. Pat. No. 3,503,929 is that the disclosed polymers are essentially linear and thus do not exhibit the more desirable characteristics of highly cross-linked systems.

SUMMARY OF THE INVENTION

Aryl esters of extended aromatic acids having a carboxyl functionality greater than two, either together with or in the absence of aryl esters of aromatic dicarboxylic acids, are heat polymerized with certain bis-(o-aminophenyl)imidazoles to produce fusible polymer intermediates. The latter, in turn, are heat polymerized at moderate pressures to produce infusible poly(benzimidazoquinazolines).

The polymer intermediates described herein are characterized by being fusible and cross-linkable. The former characteristic enables them to be used to impregnate, i.e., wet, various fibers thereby making these polymer intermediates processable to produce a variety of structures. The latter (cross-linkable) characteristic permits the production of fusible poly(benzimidazoquinazolines) which can be fabricated into a wide variety of products having excellent thermal stability. These poly(benzimidazoquinazolines), after appropriate cure, are further characterized by their insolubility in strong acids, e.g., sulphuric and phosphoric acids, and by their lack of thermoplasticity.

DESCRIPTION OF THE PREFERRED EMBODIMENT

In brief, polymer intermediates referred to herein as prepolymers are produced by the condensation of a bis-2(o-aminophenyl) imidazole represented by the structure shown hereafter at (3), with aryl esters of extended aromatic carboxylic acids having a carboxyl functionality greater than two. Optionally, a mixture of these aryl esters and aryl esters of aromatic dicarboxylic acids may be condensed together with the bis-(aminophenyl) imidazoles to produce intermediates referred to herein as precopolymers. The prepolymers and the pre-copolymers are fusible and can be heat polymerized to produce infusible poly(benzimidazoquinazolines).

The poly(benzimidazoquinazolines) derived from the prepolymers are highly cross-linked polymers consisting essentially of the following recurring unit wherein R and R" have the same meaning as set forth hereinafter.

Formula 1

The poly(benzimidazoquinazolines) derived from the precopolymers are also cross-linked polymers, but their degree of cross-linking can be substantially less than that of the polymers of Formula 1. These polymers (from the pre-copolymers) are characterized by consisting essentially of the following recurring unit wherein R, R" and R''' are defined as set forth hereinafter.

Formula 2

REACTANTS

The bis-2(o-aminophenyl)imidazoles may be represented by the following general structure:

(3)

wherein R is a tetravalent aromatic residue to which the nitrogen atoms are attached in pairs with the members of each pair being located in the ortho position with respect to each other and which contains at least one 6-carbon aromatic ring. Illustrative of the aromatic radicals comprising R in the above formula are:

and wherein R' is selected from the group consisting of:

—CO—, —O—, —S— and —SO$_2$—

Specific examples of the bis-o-aminophenyl imidazoles include 2,2'-(o-aminophenyl)-5,5'-bisbenzimidazole, 2,2'-(o-aminophenyl)-5,5'-oxybisbenzimidazole, 2,2'-(o-aminophenyl)diimidazobenzene, 2,2'-(o-aminophenyl-5,5'-sulfonyl bisbenzimidazle, 2,2'-(o-aminophenyl)-5,5'-thiobisbenzimidazole, and bis-(o-aminophenyl)diimidazo-2,3,6,7-naphthalene.

The aryl esters of extended polycarboxylic aromatic acids may be represented by the following general formula:

(4)

wherein R" is a trivalent radical selected from the group consisting of:

and wherein the symbol "φ" represents a phenyl radical.

As used herein, the term "extended aromatic acid" refers to aromatic polycarboxylic acids in which the carboxyl groups have been separated spacially from the trivalent radicals by intervening divalent aromatic groups as previously described and shown at (4). This is done by interposing an aromatic ring between the trivalent radical and each carboxyl group which otherwise would be attached directly to the central trivalent nucleus. A geometric extension of the starting carboxylic acid is thereby produced. As a specific example, the ester, triphenyl trimesate, is extended by inserting a divalent phenyl ring between the trimesic acid nucleus and each of the carboxylic groups attached thereto to produce 1,3,5-sym-tris-(p-carbophenoxyphenyl)benzene.

Use of aryl esters of the described extended aromatic acids results in much better and more efficient cross-linking as compared with the use of aryl esters of non-extended aromatic acids. Extension of the aromatic acids is obtained by the use of aromatic radicals rather than aliphatic radicals because poly(benzimidazoquinazolines) made with aryl esters of aromatic-extended aromatic acids are markedly superior in thermal stability to the poly(benzimidazoquinazolines) made with aryl esters of aliphatic-extended aromatic acids.

In order to produce cross-linking, each of the extended aromatic acids has a carboxyl functionality greater than two. Preferably, the extended aromatic acid is a tri- or tetra-functional carboxylic acid. Useful aryl esters of the extended forms of these acids include: 1,3,5-sym-tris-(p-carbophenoxyphenyl)benzene; 2,4,6-sym-tris(p-carbophenoxyphenyl)triazine; tris-(p-carbophenoxyphenyl)phenylsilane; tetrakis-(p-carbophenoxyphenyl)silane; and tetrakis-(p-carbophenoxyphenyl) methane.

The aryl esters of aromatic dicarboxylic acids may be represented by the following generalized structure:

φOOC - R''' - COOφ wherein R''' is a divalent radical which includes at least one 6-member aromatic ring and which is one of the group of Particular members of this group of aryl esters of dicarboxylic aromatic acids include: diphenyl isophthalate; diphenyl terephthalate; diphenyl-4,4'-oxybisbenzoate and diphenyl-4,4'-bisbenzoate. Esters of aromatic dicarboxylic acids are employed rather than esters of aliphatic dicarboxylic acids because the latter produce inferior poly(benzimidazoquinazolines) in terms of thermal properties.

REACTANT RATIOS

Within certain acceptable limits, the strength and thermaloxidative properties (as well as other properties) of the infusible poly(benzimidazoquinazolines) can be varied considerably to tailor them to a particular end use. Such property variations are obtained by varying the ratio of the reactants employed to produce the prepolymers and precopolymers.

As a starting point in the synthesis of the prepolymer, the aryl ester of the extended aromatic acid and bis-o-aminophenyl imidazole are employed in an equivalents ratio of about 1:1. For the purposes of this and other statements herein relating to equivalents ratios, the bis-o-aminophenyl imidazoles are assumed to have a (amine) functionality of two (although they are tetramines) since each pair of structurally-related amino groups reacts (in two steps) with a single ester group. For example, 1.5 moles of 2,2'-(o-aminophenyl)-5,5'-bisbenzimidazole will be reacted with 1 mole of 2,4,6-tris(p-carbophenoxyphenyl) triazine to provide an equivalents ratio of these reactants of 1:1.

At the equivalents ratio of about 1:1, the resulting poly(benzimidazoquinazolines) exhibit good strength and thermaloxidative characteristics. However, for applications requiring superior thermaloxidative properties, it is preferable to use an excess of the aryl ester of the extended aromatic acid. An excess of the acid of up to about 20 equivalent percent, i.e., an excess sufficient to provide up to an equivalents ratio of acid to amine of about 1.20:1 can be employed.

Figure 1:
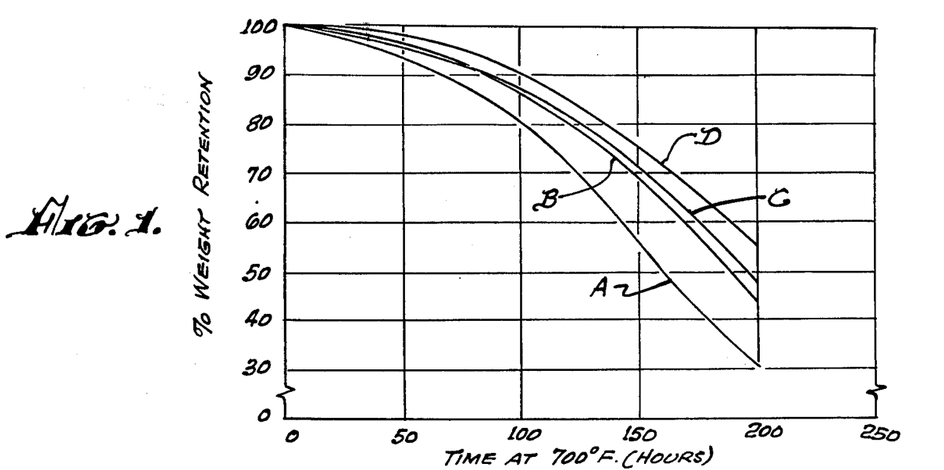
FIG. 1 is a graph illustrating the elevated temperature resistance of highly cross-linked poly(benzimidazoquinazoline) polymers of this invention made by using different equivalents ratios of acid ester to amine.
Figure 2:
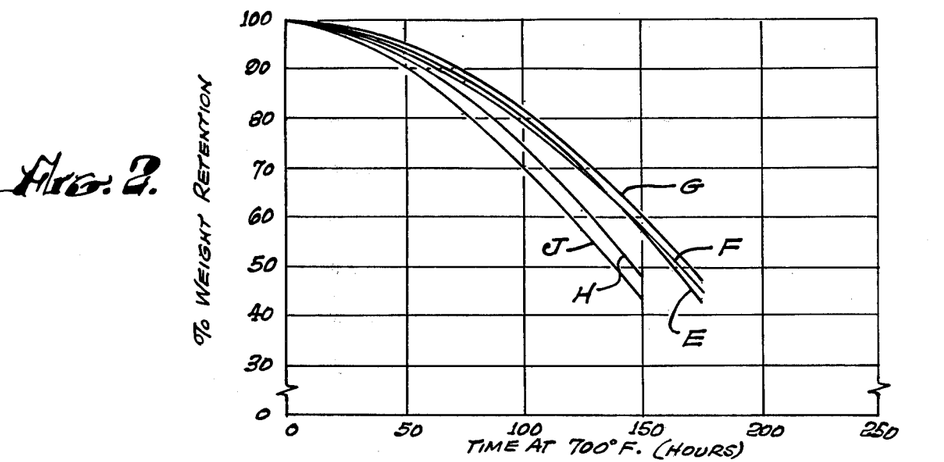
FIG. 2 is a graph illustrating the high temperature resistance for cross-linked poly(benzimidazoquinazoline) polymers made from the same reactants as the polymers which are the subject of FIG. 1 but which were cured under different conditions from the polymers of FIG. 1.

The improvement in the thermaloxidative characteristics of poly(benzimidazoquinazolines) when using an excess of acid to amine within the range between 1:1 to about 1.20:1 is shown by FIGS. 1 and 2. The curves in those Figures represent the data produced as a result of isothermally aging poly(bisbenzimidazoquinazolines) (made as described in Examples 5 and 6) in air at a temperature of 700° F. The percent weight retention as a function of time plotted in FIGS. 1 and 2 is an indication of the thermaloxidative resistance of the cross-linked, infusible poly(benzimidazoquinazolines). In FIG. 1, Curve A represents a 10.8 equiv. percent excess of the amine reactant, whereas Curves B, C and D represent 0.05, 7.75 and 17.04 equiv. percent excess of the acid reactant, respectively. As will be noted from a comparison of Curve A with the other Curves of FIG.

1, a much more rapid weight loss occurs when there is an excess of amine (Curve A) as compared to when there is an excess of acid reactant (Curves B, C and D). Additionally, as the excess of acid reactant is increased within the range between 0 – 17 equiv. percent (Curves B, C and D), there is a significant improvement in weight retention. Similar results are illustrated by FIG. 2 for the same poly(bisbenzimidazoquinazoline) as in FIG. 1 except that the final cure conditions differed as described in Examples 5 and 6. In FIG. 2, Curves E, F, G, H and J represent the use of 0, 5, 15, 25 and 50 equiv. percent excess of the acid reactant, respectively. Again, as the excess amount of acid increases to about 15 equiv. percent (Curves E, F and G), there is a significant improvement in weight retention, i.e., there is a significant decrease in weight loss. However, as the excess amount of acid reactant increases substantially beyond the latter amount, the weight loss, instead of decreasing, increases markedly as shown by Curves H and J.

In regard to the pre-copolymer, the equivalents ratio of the combined acid esters to the amine is preferably about 1:1. However, an acid ester excess may also be used to advantage to obtain improved thermaloxidative characteristics as discussed hereinbefore with respect to formation of the prepolymers.

Within the permissible equivalents ratio of acid ester to amine, the ratio of the dicarboxylic acid ester to the polycarboxylic acid ester can vary considerably. As the amount of dicarboxylic acid ester increases in proportion to the amount of polycarboxylic acid ester, the cross-link density decreases and the resulting pre-copolymers and poly(benzimidazoquinazolines) become more linear and less like the highly cross-linked poly(benzimidazoquinazolines) made from the described prepolymers. However, like the prepolymers, the pre-copolymers described herein are fusible and thereby capable of use from melts.

In general, use of polycarboxylic acid esters lead to increased strength at high temperatures in the resulting poly(benzimidazoquinazolines). They can also provide other benefits (known to those skilled in the art) such as solvent resistance. Thus, if a specified poly(benzimidazoquinazoline) from a dicarboxylic acid ester has demonstrated an outstanding property, the polymer's strength at high temperatures can be increased with little or no sacrifice in that property by the addition of a few mole percent of a polycarboxylic acid ester. As a specific example, the linear polymer resulting from diphenyl-4,4'-bisbenzoic acid and 2,2'-(o-aminophenyl)-5,5'-bisbenzimidazole, demonstrated outstanding strength retention upon aging in air at 371° C (graphite composites); however, it demonstrated slight thermoplastic behavior when testing was conducted at 455° C. This residual amount of thermoplasticity was removed with no discernible effect on the aging characteristics of the cured copolymer at 700° F by replacing a few mole percent of the diphenyl-4,4'-bisbenzoic acid with 2,4,6-sym-tris(p-carbophenoxyphenyl)triazine in the polymerization.

Sufficient cross-linking can be obtained from the use of as little as 1 mole percent of polycarboxylic acid ester (99 mole percent dicarboxylic acid ester) to provide significant advantages. Even at the one mole percent level of polycarboxylic acid ester, the resulting prepolymers and precopolymers include enough cross-linking sites to make them insoluble when processed to the poly(benzimidazoquinazoline) form so that fibers cannot be made therefrom (in contrast to the substantially linear polymers of U.S. Pat. No. 3,503,929). However, in order to more fully realize the advantages obtainable from the use of polycarboxylic acid esters, it is presently preferred to use at least 15 mole percent of the latter (85 mole percent of dicarboxylic acid ester).

Figure 3:
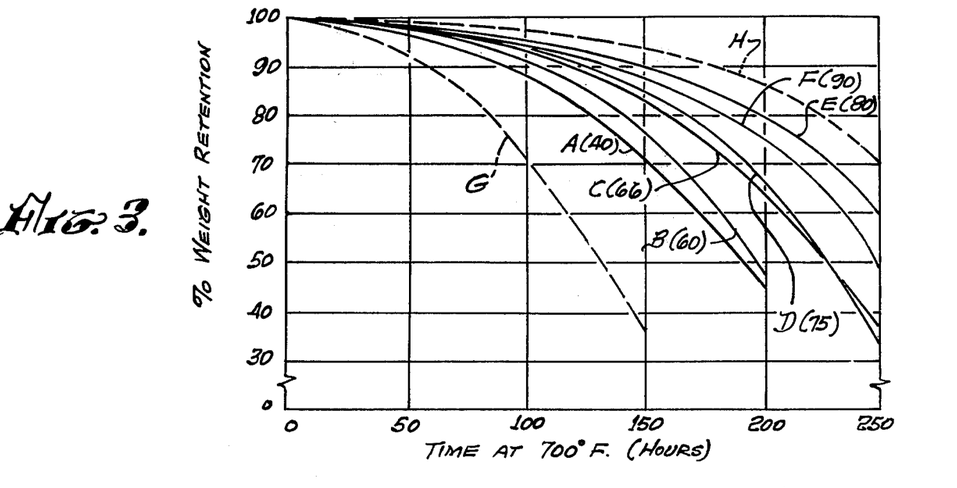
FIG. 3 is a graph showing the high temperature resistance of poly(benzimidazoquinazoline) polymers exhibiting differing amounts of cross-linking ranging from linearity to fully cross-linked.

The effect of varying the ratio of dicarboxylic acid ester to polycarboxylic acid ester over a wide range on the thermaloxidative characteristics of the resulting poly(benzimidazoquinazolines) is shown by FIG. 3. The data represented by the curves of FIG. 3 were produced as described in Example 7. In each case, the equivalents ratio of the combined acid esters to amine was 1:1, but the equivalents ratio of dicarboxylic acid ester to polycarboxylic acid ester ranged from 2:3 (Curve A(40)) to 9:1 (Curve F(90)). The value in parentheses, e.g., A(40), refers to the percent that the dicarboxylic acid ester bears to the total acid ester on an equivalents basis. Typical curves G and H for a highly cross-linked, and for a linear, poly(benzimidazoquinazoline), respectively, are also shown in FIG. 3 for comparison purposes. Although the data represented by Curves A – F are not entirely consistent due to the experimental error inherent in these systems, these curves do illustrate that as the proportion of dicarboxylic acid ester is increased in relation to the polycarboxylic acid ester, the weight retention at elevated temperatures in an oxygen-containing atmosphere of the corresponding poly(benzimidazoquinazolines) improves. However, at the same time, the physical properties of the poly(benzimidazoquinazolines) which do not include any dicarboxylic acid ester or only minimum amounts thereof will be superior to those of the more linear poly(benzimidazoquinazolines).

PREPARATION OF PREPOLYMERS AND PRE-COPOLYMERS

Both the prepolymers and the pre-copolymers are prepared by melt condensation of the bis-o-aminophenyl imidazole with the extended polycarboxylic acid ester or with the latter together with the dicarboxylic acid ester, respectively, in the substantial absence of oxygen.

In general, the reactants are charged to a flask which is suitably equipped with a stirrer and vacuum and inert gas connections and which is connected to a receiver for receiving the condensation reaction products (phenol and water) and any other material, e.g., flux, which is distilled off. The reactants are charged to the flask preferably together with a flux in which the reactants are soluble for insuring fusibility of the reactants at a temperature such that the reaction proceeds at a reasonable rate and yet may be effectively interrupted after an appropriate time interval to produce the processable, cross-linkable prepolymers and pre-copolymers. Examples of suitable fluxes are m-cresol and phenol. The oxygen is then substantially removed from the flask. Various techniques can be used to do this as is well known. For example, the steps of drawing a vacuum on the flask and thereafter introducing a gas, e.g., nitrogen, which is inert to the reactants and products into the flask, may be repeated until the oxygen is substantially evacuated from the flask. After an inert atmosphere is established in the flask (preferably at atmospheric pressure), heat is applied to the flask to promote dissolution of the extended polycarboxylic acid ester in the flux. Thereafter, the stirrer is turned on with continuing heating.

As the flask temperature is increased, the flux first distills off and thereafter the condensation reaction commences. The flask temperature is raised to a temperature range at which the condensation reaction proceeds smoothly at a reasonable rate (determined by observation of a reasonable rate of evolution of phenol and water) and is held in that temperature range until a substantially uniformly clear viscous melt is formed. For the prepolymer, the flask temperature is usually raised to about 300° C to about 320° C, whereas for the precopolymer, the flask temperature is usually raised to about 320° C to about 340° C. These temperatures are merely representative temperatures and will vary with the reactants used. The time interval between condensation reaction initiation and formation of the desired prepolymers or pre-copolymers usually is about 2.5 to 4 hours.

resulting pre-copolymers each has a PMT falling generally within the temperature range of about 150° C – 260° C. Additionally, the prepolymers and pre-copolymers are further characterized by their solubility in, or their ability to form processable slurries with, a variety of organic solvents, including N,N-dialkyl-substituted amides such as N-methylpyrrolidinone, N,N-dimethylacetamide, and hexamethyl phosphoric triamide, and including phenols such as phenol and m-cresol.

The exact structure of the prepolymers and pre-copolymers is not known; however, because of their solubility, it is surmised that the cross-link density is either quite low or nil. Whether the bonds that have formed are purely polyamide or have continued to cyclize to the benzimidazoquinazoline structure in some cases is conjectural. Most of the linkage is—from infrared spectral analysis—amide. The postulated prepolymer structure (5) is shown with R" defined as stated hereinbefore.

(5)

The formation of the clear viscous melt indicates that the starting reactants have fully dissolved into each other and, furthermore, it also indicates that the melt is substantially homogeneous. Even after the uniformly clear viscous melt is obtained "cooking" can be continued further to reduce the volatile content of the melt consistent with the use to which the melt is intended to be put and consistent with the retention of meltability for processability. In general, it is desirable to lower the volatile content as much as possible to permit realization of the highest attainable property values by the minimization of voids in the end products, although there are times when a higher volatile content may be desirable as, for example, when making a foam. It would be preferable in mose cases to reduce the volatile content to 2–3% volatiles; however, this level is difficult to reach in practice.

After the aforementioned viscous melt has been formed, heating is stopped and, preferably, a vacuum is re-applied to the flask to remove reaction gases after which an inert gas atmosphere, e.g., nitrogen, is re-established and the prepolymer or pre-copolymer is allowed to solidify and cool to room temperature.

Each of the resulting prepolymers has a polymer melt temperature (PMT) range falling generally within the temperature range of about 190° C – 280° C and the

The pre-copolymer structure is believed to be similar to (5) except that the structure contains difunctional acid ester units as well as polyfunctional acid ester units.

The fully and partially cross-linked poly(benzimidazoquinazolines) are formed from the prepolymers and pre-copolymers, respectively, by subjecting these polymer intermediates to elevated temperatures and pressure. The temperatures can vary considerably and may be as high as 525° C, although temperatures as low as 440° C may be used. Similarly, a wide range of pressures may be used. Representative pressures are 1 atmosphere to 500 psi. The poly(benzimidazoquinazolines) described herein may be produced under the foregoing temperature and pressure conditions from solutions or slurries of the prepolymer or pre-copolymer, or they may be produced from hot melts of these intermediates. In any case, after the poly(benzimidazoquinazolines) are formed, they may be further cured (or post cured) by the selective use of heat and/or pressure as is known in the art to tailor the products to particular applications.

The formation of poly(benzimidazoquinazolines) from prepolymers as described herein is typified by the following reactions starting with 2,2'-(o-aminophenyl)-5,5'-bisbenzimidazole and 2,4,6-sym-tris-(p-carbophenoxyphenyl)triazine as representative reactants.

$-\phi H, H_2O \downarrow$ (6)

$-\phi H, H_2O \downarrow$ (7)

The formation of poly(benzimidazoquinazolines) from precopolymers as described herein is typified by the following reactions starting with 2,2'-(o-aminophenyl)-5,5'-bisbenzimidazole, diphenyl-4,4'-bisbenzoate, and 2,4,6-sym-tris-(p-carbophenoxyphenyl)triazine as representative reactants.

-continued (where the pre-copolymer (8) contains unreacted phenyl ester and amine functionality as is consistent with stoichiometric considerations)

$-\phi H, H_2O$ ↓

-continued (9)

This invention is further described by the following Examples.

EXAMPLE 1

A prepolymer was made from 2,4,5-sym-tris-(p-carbophenoxyphenyl)triazine and 2,2'-(o-aminophenyl)-5,5'-bisbenzimidazole by melt condensation as follows. A 500 ml. three-necked flask equipped with an immersion thermometer, nitrogen inlet, overhead mechanical stirrer, distillation head and, through that, a receiver and a vacuum take off was charged with 66.96 gm. of 2,4,6-sym-tris-4-carbophenoxyphenyl triazine (0.100 mole), 62.46 gm. of 2,2'-(o-aminophenyl)-5,5'-bisbenzimidazole (0.150 mole) and 75 ml. of distilled m-cresol. The flask was then alternately evacuated and filled with nitrogen three times. Heat was then applied. Once the ester had dissolved in the m-cresol flux, the stirring motor was turned on. The m-cresol flux was collected in the receiver and soon after the prepolymerization reaction commenced. The flask was allowed to heat up to 308° – 320° C and was held there until the material became uniformly viscous. Heat was then removed, a vacuum was once again applied and the prepolymer was allowed to solidify. Once cooled to room temperature, the prepolymer was broken up, weighed, and a PMT taken. Yield 112.8 gm., PMT 220° – 232° C.

EXAMPLE 2

A pre-copolymer was made from 2,4,6-sym-tris-(p-carbophenoxyphenyl)triazine, diphenyl-4,4'-bisbenzoic acid, and 2,2'-(o-aminophenyl)-5,5'-bisbenzimidazole by melt condensation as follows. A 500 ml. three-necked flask equipped as in Example 1 was charged with 6.70 gm. (0.01 moles) of 2,4,6-sym-tris-(p-carbophenoxyphenyl)triazine, 23.66 gm. (0.06 moles) of diphenyl-4,4'-bisbenzoate, 31.23 gm. (0.075 moles) of 2,2'-(o-aminophenyl)-5,5'-bisbenzimidazole, and 50 ml. of distilled m-cresol. The flask was then alternately evacuated and filled with nitrogen three times and immersed in a 190° C oil bath. The temperature of the bath was brought up rapidly so that within 2 hours the solvent flux has distilled over and the initial condensation reaction to form prepolymer had begun. The reaction was allowed to proceed at a bath temperature of 330° – 340° C until the reactants formed a uniform, clear viscous melt. Heat was then removed, the vacuum reapplied and the pre-copolymer allowed to solidify. After being cooled to room temperature under nitrogen, the prepolymer was broken up, weighed, and a PMT taken. Yield 56.7 gm., PMP 233° – 242° C.

EXAMPLE 3

A laminate was made using a 2,4,6-sym-tris-(p-carbophenoxyphenyl)triazine and 2,2'-(o-aminophenyl)-5,5'bisbenzimidazole prepolymer prepared by melt condensation using solvent imprenation. A prepolymer was prepared using the aforementioned reactants by reaction for an appropriate time at a final temperature of 312° C as described in Example 1. It had a PMT of 220° – 232° C. This polymer was blended in a high-shear stirrer with its weight of N,N-dimethylacetamide and 3% by weight of Cab-O-Sil (colloidal fumed silica pigment) to give a 48.5% by weight slurry. This slurry was applied to the unidirectional Modmor II graphite fibers and the resulting wet prepreg was placed in an oven set at 120° C for 45 minutes. The still damp prepreg was removed, cut into nine 4 in. × 4 in. swatches and these were dried an additional hour at 150° C.

The dried swatches were stacked and placed between two pieces of 0.002 in. thick aluminum foil in a stainless steel trap mold, and the entire assembly was placed in a press preheated to 355° C with only contact pressure for 4.5 minutes, followed by the application of 200 psi pressure for 3 hours. The assembly was then cooled, removed from the press and the aluminum foil was removed. The part placed back in the trap mold and the modified assembly was placed in an an inert gas bag. Under a nitrogen atmosphere, this assembly was inserted into the press at 385° C and held at that temperature under 100 psi for 45 minutes. The temperature was then increased to 425° C and held for 45 minuted, followed by 485° C for 45 minutes, and finally 525° C for 45 minutes. After cooling to room temperature, the resulting cured laminate was removed and cut into test specimens.

The resin content of this laminate was 30.1% by weight. Flexural strength and modulus data were obtained using A.S.T.M. D790 and are set forth in Table 1.

Table 1

| Test Conditions | Flexural Strength (psi) | Modulus (psi × $10^{-6}$) |
|---|---|---|
| Room Temperature | 281,500 | 17.16 |
| 700° F after 1 hr. at 700° F in air | 171,200 | 18.33 |
| 700° F after 50 hr. at 700° F in air | 160,000 | 16.90 |
| 700° F after 100 hr. at 700° F in air | 143,700 | 14.50 |
| 700° F after 200 hr. at 600° F in air | 225,500 | 16.85 |

EXAMPLE 4

A laminate was made using a 2,4,6-sym-tris-(p-carbophenoxyphenyl)triazine, diphenyl-4,4'-bisbenzoate and 2,2'-(o-aminophenyl)-5,5'-bisbenzimidazole pre-copolymer prepared by melt condensation as follows. This pre-copolymer was prepared by reaction at a final temperature of 340° C as otherwise described in Example 2. It had a PMT of 158° – 165° C. This pre-copolymer was blended in a high-shear stirrer with twice its weight of N-methyl pyrrolidinone. The mixture was then brush-coated on a continuous winding of Modmor II unidirectional fiber on a 44 in. circumference drum at 5 tows per inch width. The resulting wrapped prepreg was dried 20 minutes at 120° C, re-coated as described, dried 20 minutes at 120° C, re-coated as described, and finally dried 30 minutes at 150° C.

The swatch of prepreg was cut into nine 4 in. × 4 in. plies and these were stacked in a trap mold encased in an open inert gas bag. This assembly was placed in a 345° C press under flowing nitrogen and held there at contact pressure for 20 minutes. The gas bag was then sealed and 50 psi pressure applied. After 2 hours under these conditions, the assembly was allowed to cool. The laminate was removed, cleaned and replaced in the mold between plies of glass bleeder cloth. The mold was reinserted in the inert gas bag and the assembly replaced in a cold press under 200 psi. The temperature was taken directly up to 345° C, held there for 45 minutes, to 385° C for 45 minutes, to 425° C for 45 minutes, and finally held for 90 minutes at 455° C. After cooling to room temperature, the laminate was removed and cut into test specimens. The flexural and modulus data set forth in Table II were obtained using A.S.T.M. D790 with all specimens being aged in circulating air oven prior to test and tested at temperature.

TABLE II

| Test Conditions | Flexural Strength (psi) | Modulus (psi × $10^{-6}$) |
|---|---|---|
| Room Temperature | 162,000 | 17.2 |
| 700° F after 1 hr. at 700° F | 112,000 | 15.6 |
| 700° F after 50 hr. at 700° F | 111,000 | 14.6 |
| 700° F after 200 hr. at 700° F | 108,000 | 16.4 |

While the fully cross-linked poly(benzimidazoquinazolines) which are made from the prepolymers of the present invention do not provide long time, high temperature strength characteristics which are as good as those characteristics provided by the poly(benzimidazoquinazolines) made from the herein described pre-copolymers, the rigidity of the former makes them particularly suitable for various uses where this property is important. For example, the cross-linked poly (benzimidazoquinazolines) of the present invention may be used to fabricate molded parts which have high rigidity and excellent high temperature strength properties.

EXAMPLE 5

Prepolymers were made from 2,4,6-tris-(p-carbophenoxyphenyl)triazine and 2,2'-(o-aminophenyl)-5,5'-bisbenzimidazole by melt condensation as described in Example 1, except that the ratio of these two reactants was varied to provide 10.8 equiv. percent excess amine in one case (A), and the following equiv. percent excess ester in other cases: 0.05 (B); 7.75 (C); and 17.04 (D).

These prepolymers were each subjected to a temperature/pressure condition of 524° C and 1 atm. for 45 minutes to produce highly cross-linked, infusible poly(-benzimidazoquinazolines).

Specimens of the cured poly(benzimidazoquinazolines) were heated rapidly to 700° F in air and held at that temperature. At various time intervals, these specimens were cooled, weighed and returned to the isothermal environment. The resulting weights were compared with the original weights of the specimens at 700° F to determine the isothermal weight loss. The data are plotted in FIG. 1.

EXAMPLE 6

This Example is the same as Example 5 except that a time/temperature cure of 90 minutes at 469° C was used in place of the 45 minutes at 524° C used in Example 5 and except that the following equiv. percent excess ester values were used instead of those given in Example 5: 0, 5, 15, 25 and 50. Each of the resulting prepolymers had a PMT of 204° – 210° C, 205° – 216° C, 273° – 284° C, 196° – 203° C and 208° – 217° C, respectively.

The data are plotted in FIG. 2 with Curves E, F, G, H and J representing the ester excesses of 0, 5, 15, 25 and 50, respectively.

EXAMPLE 7

Pre-copolymers were made from diphenyl-4,4'-bisbenzoate, 2,2'-(o-aminophenyl)-5,5'-bisbenzimidazole, and 2,4,6-tris (p-carbophenoxyphenyl)triazine by the method described in Example 2 except that the ratio of dicarboxylic acid ester to polycarboxylic acid ester was varied while maintaining a total acid ester/amine equivalents ratio of 1:1. The dicarboxylic acid ester to polycarboxylic acid ester equivalents ratios included 2:3, 1:1, 2:1, 3:1, 4:1, and 9:1 with the amount of the dicarboxylic acid ester as a percent of the total equivalents of ester correspondingly varying from 40% to 90%. The resulting pre-copolymers had PMT's of 244° C – 250° C, 194° C – 201° C, 178° C – 183° C, 197° C – 207° C, 198° C – 209° C and 198° C – 208° C, respectively.

These pre-copolymers were each subjected to the following temperature/pressure conditions to produce cross-linked, infusible poly(benzimidazoquinazoline) copolymers: for the equivalents ratios of 2:3, 1:1 and 2:1 – 326° C/1 atm.; for the equivalents ratios of 3:1 and 4:1 – 328° C/1 atm.; and for the equivalents ratio of 9:1 – 320° C/1 atm.

As in Example 5, specimens of these poly(benzimidazoquinazolines) were subjected to isothermal heating in air at 700° F to determine their isothermal weight loss under these conditions. The data are plotted in FIG. 3 with Curves A - F representing the ester/amine ratio range of 2:3, 1:1, 2:1, 3:1, 4:1 and 9:1, respectively.

We claim:

1. A highly cross-linked polybenzimidazoquinazoline for laminating and molding use consisting of the following recurring unit:

wherein R is a tetravalent aromatic residue to which the nitrogen atoms are attached in pairs with the members of each pair being located in the ortho position with respect to each other and which contains at least one 6-carbon aromatic ring, and wherein R" is a trivalent radical selected from the group consisting of 2. The polybenzimidazoquinazoline of claim 1 wherein R is a tetravalent aromatic radical selected from the group consisting of and wherein R' is selected from the group consisting of

—CO—, —O—, —S— and —SO$_2$—

3. A polybenzimidazoquinazoline according to claim 1 wherein the recurring unit is:

4. A cross-linked polybenzimidazoquinazoline for laminating and molding use consisting essentially of the following recurring unit:

wherein R is a terravalent aromatic residue to which the nitrogen atoms are attached in pairs with the members of each pair being located in the ortho position with respect to each other and which contains at least one 6-carbon aromatic ring, and wherein R'' is a trivalent radical selected from the group consisting of and wherein R''' is a divalent aromatic radical selected from the group consisting of and .

5. The polybenzimidazoquinazoline of claim 4 wherein R is a tetravalent radical selected from the group consisting of and and wherein R' is selected from the group consisting of

—CO—, —O—, —S— and —SO$_2$—.

6. The polybenzimidazoquinazoline according to claim 4 wherein the recurring unit is:

7. A method of making a cross-linked polybenzimidazoquinazoline comprising the steps of:
   providing a reaction mixture comprising (a) a bis-2(o-aminophenyl)imidazole having the formula wherein R is a tetravalent aromatic residue to which the nitrogen atoms are attached in pairs with the members of each pair being located in the ortho position with respect to each other and which contains at least one 6-carbon aromatic ring, and (b) an aryl ester of an extended polycarboxylic aromatic acid having the formula wherein R" is a trivalent radical selected from the group consisting of and (b) being present in said reaction mixture in a range between about 1 equivalent and about 1.2 equivalents per equivalent of said (a);
   heating said reaction mixture in the substantial absence of oxygen to melt condense said (a) with said (b), said heating continuing at least until a clear viscous melt is first obtained to produce a fusible, cross-linkable prepolymer;
   curing said prepolymer to produce said cross-linked polybenzimidazoquinazoline.

8. The method of claim 7 wherein R is a tetravalent aromatic radical selected from the group consisting of and and wherein R' is selected from the group consisting of:

—CO—, —O—, —S— and —SO$_2$—.

9. The method of claim 7 wherein said reaction mixture includes a flux in which said (a) and (b) are soluble.

10. The method of claim 7 including the additional steps of:
admixing said prepolymer with an organic solvent with which said prepolymer is soluble at least to the extent of forming a processable slurry therewith; and
coating said processable slurry on a substrate; prior to curing said prepolymer.

11. The method of claim 10 wherein said organic solvent is selected from the group consisting of: N-methylpyrrolidinone, N,N-dimethylacetamide, hexamethyl phosphoric triamide, phenol and m-cresol.

12. The method of claim 7 wherein said heating is continued after said clear viscous melt is first obtained to reduce the volatile content of said melt to a desired level consistent with retention of meltability for processability.

13. The method of claim 7 wherein said reaction mixture further includes (c) an aryl ester of an aromatic dicarboxylic acid having the structure

φOOC - R''' - COOφ wherein R''' is a divalent radical selected from the group consisting of:

and .

the equivalents ratio of said (b) plus said (c) to said (a) being about 1–1.2:1, said (b) comprising at least about 1 mol percent of said (b) and (c), said heating producing a precopolymer.

14. The method of claim 13 wherein said (b) comprises at least 15 mol percent of said (b) and (c).

15. The method of claim 13 wherein said reaction mixture includes a flux for said (a), (b) and (c).

16. The method of claim 13 including the additional steps of:

admixing said pre-copolymer with an organic solvent with which said pre-copolymer is soluble at least to the extent of forming a processable slurry therewith; and
coating said processable slurry on a substrate; prior to curing said pre-copolymer.

17. The method of claim 16 wherein said organic solvent is selected from the group consisting of: N-methylpyrrolidinone, N,N-dimethylacetamide, hexamethyl phosphoric triamide, phenol and m-cresol.

18. The method of claim 13 wherein said heating is continued after said clear viscous melt is first obtained to reduce the volatile content of said melt to a desired level consistent with retention of meltability for processability.

19. A method of making a fusible, cross-linkable polymer intermediate curable to produce a cross-linked polybenzimidazoquinazoline, said method comprising:
providing a reaction mixture comprising (a) a bis-2(o-aminophenyl)imidazole having the formula wherein R is a tetravalent aromatic residue to which the nitrogen atoms are attached in pairs with the members of each pair being located in the ortho position with respect to each other and which contains at least one 6-carbon aromatic ring, and (b) an aryl ester of an extended polycarboxylic aromatic acid having the formula wherein R'' is a trivalent radical selected from the group consisting of said (b) being present in said reaction mixture in a range between about 1 equivalent and about 1.2 equivalents per equivalent of said (a);

heating said reaction mixture in the substantial absence of oxygen to melt condense said (a) with said (b), said heating continuing at least until a clear viscous melt is first obtained to produce a fusible, cross-linkable prepolymer.

20. The method of claim 19 wherein R is a tetravalent aromatic radical selected from the group consisting of and wherein R' is selected from the group consisting of:

—CO—, —O—, —S—, and —SO$_2$—.

21. The method of claim 19 wherein said reaction mixture includes (c) an aryl ester of an aromatic dicarboxylic acid having the structure

φOOC - R''' - COOφ wherein R''' is a divalent radical selected from the group consisting of the equivalents ratio of said (b) plus said (c) to said (a) being about 1–1.2:1, said (b) comprising at least about 1 mol percent of said (b) and (c), said heating producing a precopolymer.

22. The method of claim 21 wherein said (b) comprises at least 15 mol percent of said (b) and (c).

23. A prepolymer made according to the method of claim 19.

24. The prepolymer of claim 23 having a polymer melt temperature range between about 190° C and about 280° C.

25. A pre-copolymer made according to the method of claim 21.

26. The pre-copolymer of claim 25 having a polymer melt temperature range between about 150° C and about 260° C.

27. A product made according to the method of claim 10.

28. A product made according to the method of claim 16.

29. The polybenzimidazoquinazoline of claim 1 wherein said polybenzimidazoquinazoline is infusible.

30. The polybenzimidazoquinazoline of claim 4 wherein said polybenzimidazoquinazoline is infusible.

* * * * *